US008629593B2

United States Patent
Yoo et al.

(10) Patent No.: US 8,629,593 B2
(45) Date of Patent: Jan. 14, 2014

(54) SPINDLE MOTOR WITH SLEEVE HOLDER INCLUDING CYLINDRICAL PART, SEATING PART, AND COUPLING PART

(75) Inventors: Young Sun Yoo, Gyunggi-do (KR); Yun Yeong Park, Gyunggi-do (KR); Ho Jun Yoo, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/165,303

(22) Filed: Jun. 21, 2011

(65) Prior Publication Data

US 2012/0248914 A1    Oct. 4, 2012

(30) Foreign Application Priority Data

Apr. 4, 2011    (KR) .................. 10-2011-0030620

(51) Int. Cl.
*H02K 5/16* (2006.01)
*H02K 7/11* (2006.01)
*F16C 32/06* (2006.01)

(52) U.S. Cl.
USPC ............ 310/90; 310/67 R; 384/100; 384/105; 384/107

(58) Field of Classification Search
USPC ........ 310/90, 154.07, 156.08, 67 R; 384/100, 384/105, 107, 121
See application file for complete search history.

(56) References Cited

U.S. PATENT DOCUMENTS

| 2002/0050749 A1* | 5/2002 | Higguchi ...................... 310/67 R |
| 2002/0117911 A1 | 8/2002 | Fukutani |
| 2004/0114497 A1 | 6/2004 | Lee et al. |
| 2004/0221444 A1 | 11/2004 | Fujii et al. |
| 2008/0164776 A1* | 7/2008 | Yoshimatsu ................. 310/90.5 |
| 2009/0106784 A1* | 4/2009 | Yoon ............................. 720/706 |
| 2010/0314958 A1 | 12/2010 | Hidaka et al. |
| 2011/0006634 A1* | 1/2011 | Nomura et al. ........ 310/216.113 |
| 2012/0017227 A1 | 1/2012 | Kim et al. |

FOREIGN PATENT DOCUMENTS

| JP | 08-228461 A | 9/1996 |
| JP | 2002-262540 A | 9/2002 |
| JP | 2003-324891 A | 11/2003 |
| JP | 2004-328909 A | 11/2004 |
| KR | 10-2004-0051187 | 6/2004 |
| KR | 10-2010-0135015 A | 12/2010 |
| KR | 10-1019271 | 3/2011 |
| WO | 2008/053670 A1 | 5/2008 |

OTHER PUBLICATIONS

Korean Office Action, with English Translation, issued in Korean Patent Application No. 10-2011-0030620, dated Jan. 31, 2012.
Japanese Office Action issued in Japanese Application No. 2011-118141 dated Jun. 18, 2013 with English Translation.

* cited by examiner

*Primary Examiner* — Tran Nguyen
*Assistant Examiner* — Jose Gonzalez Quinones
(74) *Attorney, Agent, or Firm* — McDermott Will & Emery LLP

(57) ABSTRACT

There is provided a spindle motor including: a sleeve rotatably supporting a shaft; a sleeve holder supporting the sleeve and formed through a pressing process; a stator core fixedly mounted on an outer circumferential surface of the sleeve holder; and a pulling magnet fixedly mounted on an upper surface of the stator core, wherein the stator core includes a burr insertion stepped part formed in a lower portion of an inner diameter portion thereof.

8 Claims, 6 Drawing Sheets

SPINDLE MOTOR WITH SLEEVE HOLDER INCLUDING CYLINDRICAL PART, SEATING PART, AND COUPLING PART

CROSS-REFERENCE TO RELATED APPLICATIONS

This application claims the priority of Korean Patent Application No. 10-2011-0030620 filed on Apr. 4, 2011, in the Korean Intellectual Property Office, the disclosure of which is incorporated herein by reference.

BACKGROUND OF THE INVENTION

1. Field of the Invention

The present invention relates to a spindle motor, and more particularly, to a spindle motor including a stator core mounted on a sleeve holder.

2. Description of the Related Art

Generally, a spindle motor provided in an optical disc drive serves to rotate a disc so that an optical pickup mechanism may read data recorded in the disc.

Meanwhile, the spindle motor includes a shaft rotating together with a rotor case, wherein the shaft is rotatably mounted within a sleeve, the sleeve being fixedly mounted in a sleeve housing.

Further, the sleeve housing may have a stator core fixedly mounted on an outer circumferential surface thereof, wherein the stator core has a coil wound therearound in order to rotate the rotor case through electromagnetic interaction with a magnet mounted on a rotor case.

Meanwhile, the sleeve housing and the stator core may be formed through a pressing process. However, in the case in which the stator core and the sleeve housing are formed through the pressing process, when the stator core and the sleeve housing are assembled, assembly tolerance increases due to burrs generated during the forming by the pressing process.

That is, when the stator core and the sleeve housing are assembled, assembly defects may occur due to the presence of burrs.

SUMMARY OF THE INVENTION

An aspect of the present invention provides a spindle motor having reduced interference at the time of assembling a sleeve holder and a stator core, due to burrs formed on an inner diameter portion of the stator core formed through a pressing process, and having reduced assembly tolerance.

Another aspect of the present invention provides a spindle motor having reduced manufacturing costs through an increase in a lifespan of a pressing mold for a sleeve holder formed through a pressing process.

According to an aspect of the present invention, there is provided a spindle motor including: a sleeve rotatably supporting a shaft; a sleeve holder supporting the sleeve and formed through a pressing process; a stator core fixedly mounted on an outer circumferential surface of the sleeve holder; and a pulling magnet fixedly mounted on an upper surface of the stator core, wherein the stator core includes a burr insertion stepped part formed in a lower portion side of an inner diameter portion thereof.

The stator core may include an adhesive receiving stepped part formed in an upper portion of the inner diameter portion thereof, wherein the adhesive receiving stepped part receives an adhesive applied at the time of adhering the pulling magnet.

The sleeve holder may include a cylindrical part supporting the sleeve; a seating part extending outwardly from a lower end of the cylindrical part in a radial direction and having the stator core seated thereon; and a coupling part extending from the seating part, formed to be bent therefrom, and attached to the base member.

The coupling part may include a connecting hole formed therein, the connecting hole having a fixing member inserted therein so as to attach the coupling part to the base member.

The burr insertion stepped part may be disposed in a corner formed by the cylindrical part and the seating part.

The burr insertion stepped part and the adhesive receiving stepped part may be formed to have a plurality of steps.

According to another aspect of the present invention, there is provided a spindle motor including: a base member including a mounting part formed to be stepped; a shaft disposed on the mounting part; a sleeve rotatably supporting the shaft and disposed on the mounting part; a sleeve holder attached to the base member so as to support the sleeve and formed through a pressing process; a stator core fixedly mounted on an outer circumferential surface of the sleeve holder and including a burr insertion stepped part formed in a lower edge of an inner diameter portion thereof, the burr insertion stepped part having burrs inserted thereinto, the burrs being generated by the pressing process; and a pulling magnet fixedly mounted on an upper surface of the stator core.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Moreover, detailed descriptions related to well-known functions or configurations will be ruled out in order not to unnecessarily obscure subject matters of the present invention.

Figure 1:
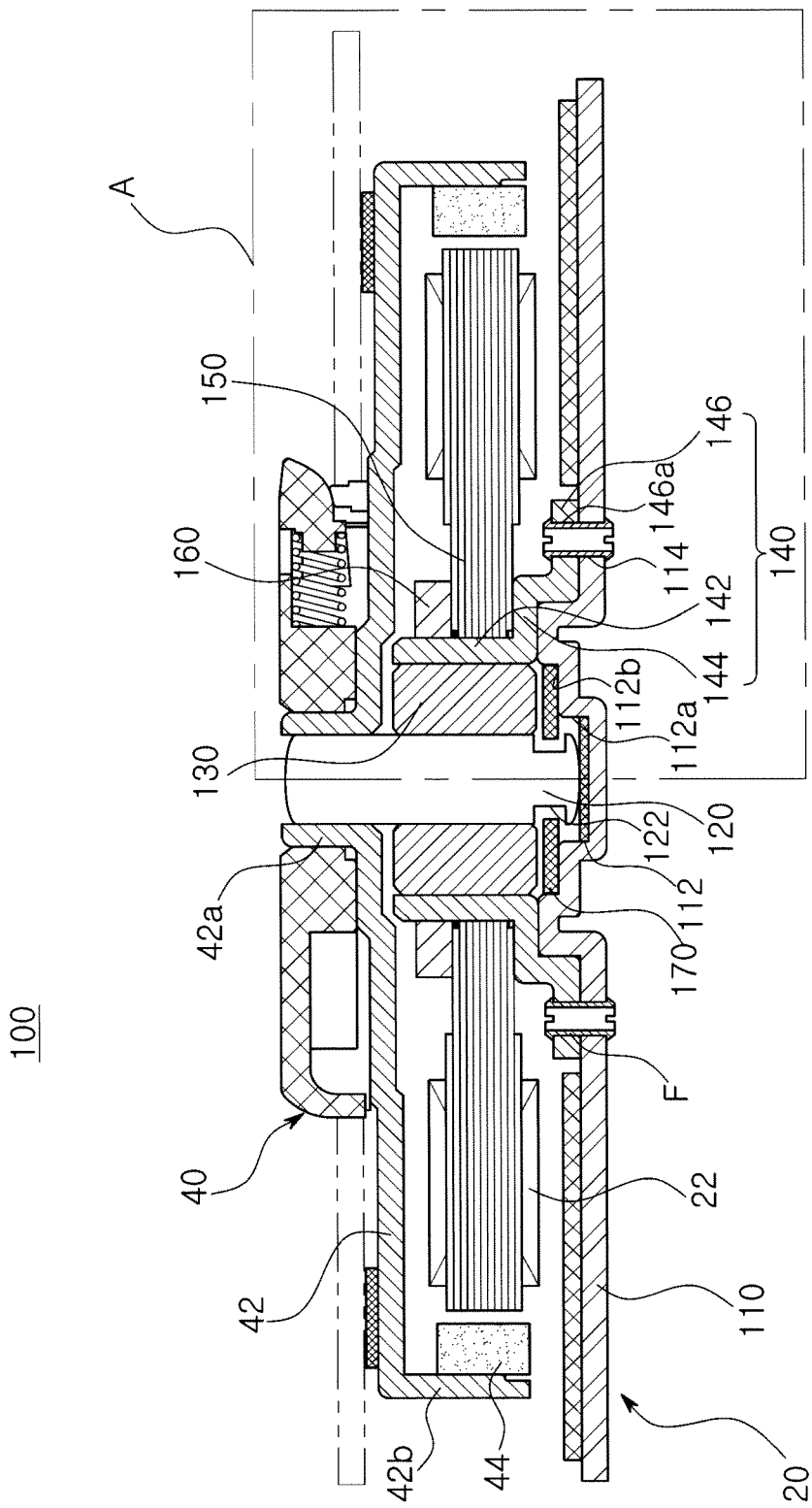
FIG. 1 is a cross-sectional view schematically showing a spindle motor according to an embodiment of the present invention.
Figure 2:
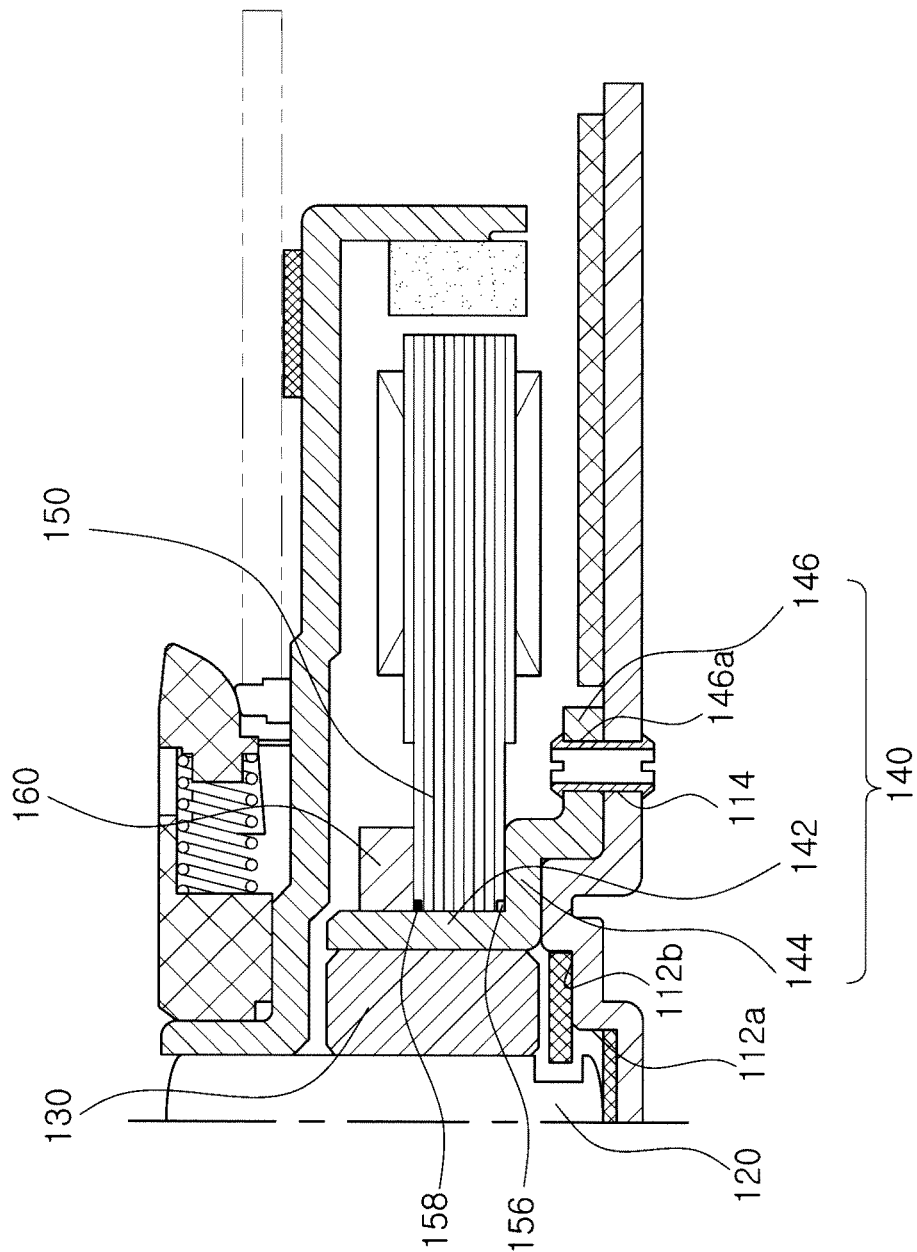
FIG. 2 is an enlarged view of part A of FIG. 1.

FIG. 1 is a cross-sectional view schematically showing a spindle motor according to an embodiment of the present invention; FIG. 2 is an enlarged view of part A of FIG. 1; and FIG. 3 is a bottom perspective view showing a stator core according to an embodiment of the present invention.

Figure 3:
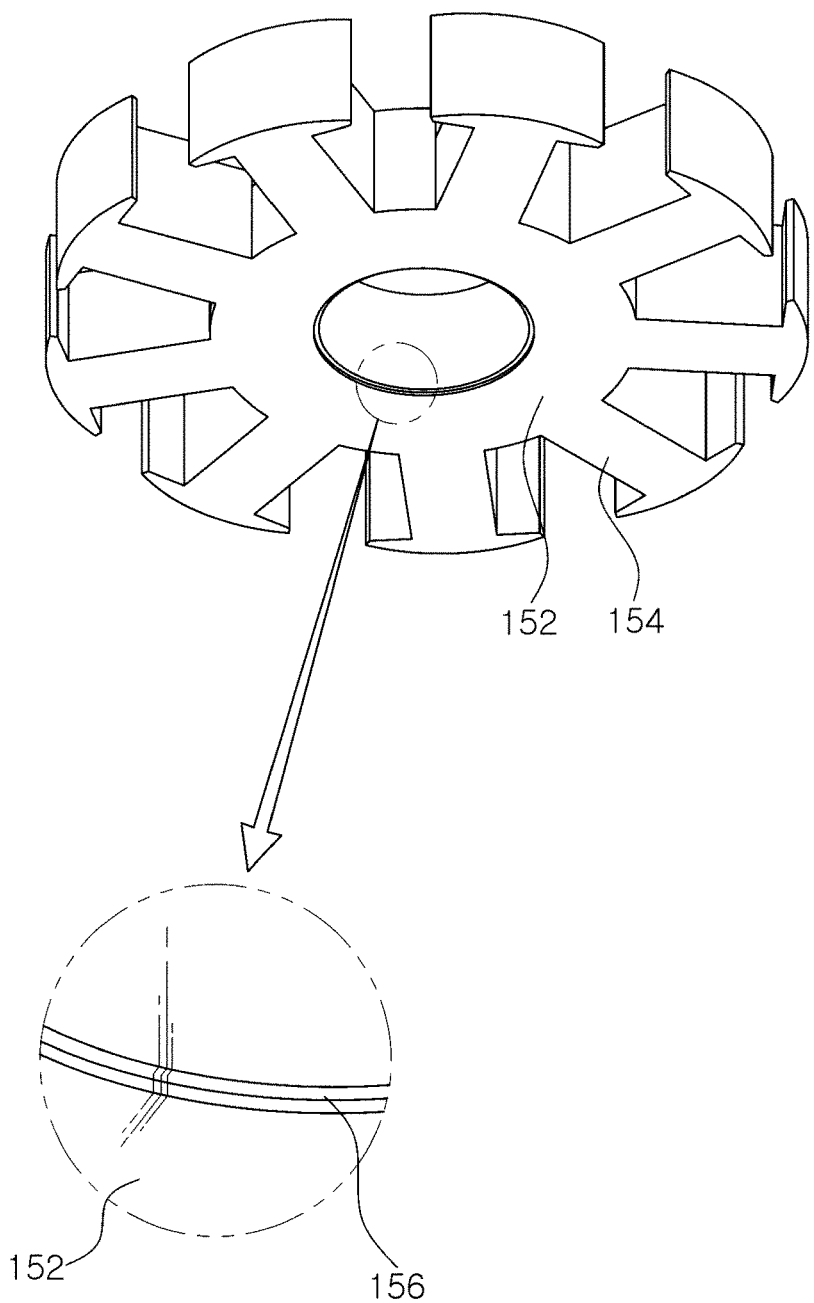
FIG. 3 is a bottom perspective view showing a stator core according to an embodiment of the present invention.

Referring to FIGS. 1 to 3, a spindle motor 100 according to an embodiment of the present invention may include a base member 110, a shaft 120, a sleeve 130, a sleeve holder 140, a stator core 150, and a pulling magnet 160.

Meanwhile, the spindle motor 100, which is, for example, a motor used in a disc driving device rotationally driving a disc, may be mainly configured of a stator 20 and a rotor 40.

The stator 20, which refers to all fixed members, with the exception of rotating members, may include the base member 110, the sleeve 130, the sleeve holder 140, the stator core 150, the pulling magnet 160, and the like.

In addition, the rotor 40, which refers to a member rotating based on the shaft 120, may include a rotor case 42, a magnet 44, and the like.

A rotational driving scheme of the above-mentioned rotor 40 will be simply described. The rotor case 42 may include a hub 42a having the shaft 120 press-fitted thereinto and connected thereto and a magnet coupling part 42b having the annular ring shaped magnet 44 disposed on an inner surface thereof.

In addition, the magnet 44 may be a permanent magnet generating magnetic force having a predetermined strength by alternately magnetizing an N pole and an S pole thereof in a circumferential direction.

Further, the stator core 150 of the stator 20 has a coil 22 wound therearound.

Meanwhile, the magnet 44 included in the inner surface of the magnet coupling part 42b is disposed to face the stator core 150 having the coil 22 wound therearound, and the rotator case 42 rotates by electromagnetic interaction between the magnet 44 and the coil 22.

At this time, the rotor case 42 rotates together with the shaft 120 based on the shaft 120, such that the rotor 40 including the rotor case 42 rotates.

Here, terms with regard to directions will be defined. As viewed in FIG. 1, an axial direction relates to a vertical direction based on the shaft 120, a radial direction relates to a direction toward an outside edge of the rotor case 42 based on the shaft 120 or a direction toward the center of the shaft 120 based on the outside edge of the rotor case 42, and a circumferential direction relates to a rotating direction around an outer circumferential surface of the shaft 120.

The base member 110 may include a mounting part 112 formed to be stepped. The mounting part 112 may include a shaft insertion groove 112a having a lower end of the shaft 120 insertedly disposed therein and a stopper ring seat groove 112b having a step from a bottom surface of the shaft insertion groove 112a.

That is, the mounting part 112 may be configured of the shaft insertion groove 112a and the stopper ring seat groove 112b.

Meanwhile, the stopper ring seat groove 112b may include a stopper ring 170 mounted therein in order to prevent excessive floating of the shaft 120. In addition, the stopper ring 170 has the sleeve 130 disposed on an upper portion thereof to thereby prevent the stopper ring 170 from being separated from the stopper ring seat groove 112b.

Further, the base member 110 may include a coupling hole 114 disposed in the vicinity of the mounting part 112 and coupled to the sleeve holder 140. A detailed description thereof will be provided below.

The shaft 120 is disposed on the mounting part 112. That is, the lower end of the shaft 120 is insertedly disposed in the shaft insertion groove 112a of the mounting part 112. In addition, the shaft 120 may include a connecting groove 122 having an inner diameter portion of the stopper ring 170 inserted thereinto. That is, the stopper ring 170 may have a toroidal shape, and the inner diameter portion of the stopper ring 170 may be insertedly disposed in the connecting groove 122.

Therefore, when the shaft 120 rotates, the excessive floating of the shaft 120 may be prevented by the stopper ring 170.

In addition, the shaft 120 has the rotor case 42 fixedly mounted on an upper end thereof, such that when the rotor case 42 rotates, the shaft 120 rotates together with the rotor case 42.

The sleeve 130 rotatably supports the shaft 120. To this end, the shaft 120 may have a hollow cylindrical shape. That is, the shaft 120 may be mounted to penetrate through the sleeve 130 to thereby be rotatably supported.

The sleeve holder 140 supports the sleeve 130, and may be formed through a pressing process.

Meanwhile, the sleeve holder 140 may include a cylindrical part 142 supporting the sleeve 130, a seating part 144 formed to extend outwardly from a lower end of the cylindrical part 142 in a radial direction and having the stator core 150 seated thereon, and a coupling part 146 extending from the seating part 144, formed to be bent therefrom, and attached to the base member 110.

The cylindrical part 142 has the sleeve 130 insertedly mounted therein. That is, the sleeve 130 is mounted to be inserted into the cylindrical part 142 of the sleeve holder 140, and an outer circumferential surface of the sleeve 130 and an inner circumferential surface of the cylindrical part 142 may be adhered to each other by an adhesive.

The sleeve 130 may be fixedly mounted on the cylindrical part 142 of the sleeve holder 140.

The seating part 144 is formed to extend from the lower end of the cylindrical part 142 so that the stator core 150 may be seated thereon. That is, the seating part 144 is formed to extend from the lower end of the cylindrical part 142 so that a bottom surface of an inner diameter portion of the stator core 150 may be supported. Here, an inner circumferential surface of the stator core 150 is mounted to be closely adhered to an outer circumferential surface of the cylindrical part 142.

In addition, the coupling part 146 is formed to extend from the seating part 144, and has a bent shape in order to be attached to the base member 110. Further, the coupling part 146 may include a connecting hole 146a, formed at a position corresponding to the coupling hole 114 of the base member 110.

That is, a fixing member F is inserted into the coupling hole 114 of the base member 110 and the connecting hole 146a formed in the coupling part 146 of the sleeve holder 140, such that the sleeve holder 140 may be fixedly mounted on the base member 110.

Meanwhile, the sleeve holder 140 may be formed through the pressing process. Therefore, the seating part 144 and the coupling part 146 have a bent shape, such that edge portions, which are bent portions of the seating part 144 and the coupling part 146, are formed through the pressing process to thereby be roundedly formed.

The stator core 150 is fixedly mounted on an outer circumferential surface of the sleeve holder 140. Meanwhile, the stator core 150 may be configured of a body part 152 having a ring shape and a plurality of teeth parts 154 formed to extend from the body part 152, as shown in FIG. 3.

That is, the stator core 150 may be mounted on the sleeve holder 140 so that the body part 152 of the stator core 150 is fixed to the cylindrical part 142 of the sleeve holder 140.

In addition, the body part 152 of the stator core 150 has a ring shape so that the cylindrical part 142 of the sleeve holder 140 may pass therethrough, and a hole formed in the body part 152 may be formed by the pressing process.

Therefore, the body part 152 may have burrs formed at a lower end thereof by the pressing process.

Meanwhile, the stator core 150 includes a burr insertion stepped part 156 formed in a lower portion of an inner diameter portion thereof, wherein the burr insertion stepped part 156 has the burrs generated by the pressing process inserted thereinto. In other words, the body part 152 of the stator core 150 includes the burr insertion stepped part 156 formed in a bottom edge thereof, and the burrs generated by the pressing process may be disposed in the burr insertion stepped part 156.

Therefore, in the case in which the stator core 150 is attached to the sleeve holder 140, interference between the stator core 150 and the sleeve holder 140 due to the burrs formed at the lower portion (that is, a lower end of the hole of the body part 152) of the inner diameter portion of the stator core 150 may be reduced.

In other words, in the case in which the stator core 150 does not have the burr insertion stepped part 156, when the stator core 150 is attached to the sleeve holder 140, the burrs contact the seating part 144 of the sleeve holder 140, such that an assembly tolerance of the stator core 150 and the sleeve holder 140 may be increased.

However, the stator core 150 includes the burr insertion stepped part 156 formed in the body part 152 thereof, such that the burrs formed by the pressing process may be disposed to be inserted into the burr insertion stepped part 156, whereby the assembly tolerance of the stator core 150 and the sleeve holder 140 may be reduced.

Meanwhile, the stator core 150 may include an adhesive receiving stepped part 158 formed in an upper portion of the inner diameter portion thereof, wherein the adhesive receiving stepped part 158 receives an adhesive applied at the time of adhering the pulling magnet 160.

That is, the stator core 150 includes the adhesive receiving stepped part 158 formed in an upper surface of the body part 152 thereof, and the adhesive applied at the time of mounting the pulling magnet 160 is received in the adhesive receiving stepped part 158, whereby the pulling magnet 160 may be more firmly fixed.

In addition, the adhesive receiving stepped part 158 may be formed to have the same shape as that of the burr insertion stepped part 156. Therefore, in the case in which the stator core 150 is attached to the sleeve holder 140, the stator core 150 may be mounted on the sleeve holder 140 regardless of the orientation of the stator core 150. Therefore, an assembly process may be more easily performed.

The pulling magnet 160 may be fixedly mounted on an upper surface of the stator core 150. That is, the pulling magnet 160 may be fixedly mounted on the upper surface of the body part 152 of the stator core 150 by an adhesive.

In addition, the pulling magnet 160 may have a ring shape, and may be formed to have a width wider than a radial width of the adhesive receiving stepped part 158.

Further, the pulling magnet 160 serves to generate magnetic force pulling the rotor case 42 downwardly in an axial direction to thereby prevent the rotor 40 from being excessively floated at the time of the rotation of the rotor case 42.

As described above, a space in which the burrs generated by the pressing process may be insertedly disposed is provided through the burr insertion stepped part 156 formed in the lower edge of the inner diameter portion of the stator core 150, whereby the interference due to the burrs generated at the time of the assembly of the sleeve holder 140 and the stator core 150 may be reduced.

In addition, the assembly tolerance of the sleeve holder 140 and the stator core 150 due to the burrs may be reduced.

Meanwhile, a structure capable of reducing interference with the burrs may not be used in the sleeve holder 140 having a more complicated shape than that of the stator core 150, such that a lifespan of a pressing mold used at the time of the molding of the sleeve holder 140 may be increased, whereby the manufacturing costs of the spindle motor may be reduced.

A more detailed description thereof will hereinafter be provided. The sleeve holder 140 and the stator core 150 may be formed through the pressing process in order to reduce the manufacturing costs of the spindle motor. Here, the stator core 150 includes the hole formed in the inner diameter portion thereof by the pressing process, such that the burrs are generated, as described above. That is, the hole formed in the body part 152 of the stator core 150 includes the burrs generated in the lower end thereof by the pressing process.

Meanwhile, a case in which a groove similar to the above-mentioned burr insertion stepped part 156 is formed in the seating part 144 of the sleeve holder 140 in order to reduce the assembly tolerance of the stator core 150 and the sleeve holder 140 due to the burrs formed as described above will be described.

The sleeve holder 140 is also formed through the pressing process. In order to form the groove similar to the burr insertion stepped part 156 in the seating part 144 as described above, a protrusion part should be formed in the press mold. Since the protrusion part should form a groove having a small size, it may be formed to slightly protrude from a mold surface forming the seating part 144.

However, in this case, when the manufacturing of the sleeve holder 140 is repeated, the protrusion part may be worn out or damaged. In this case, the lifespan of the pressing mold ends. As a result, the entire pressing mold should be replaced due to damage to or abrasion of the protrusion part.

However, the stator core 150 is formed to have a predetermined shape by stacking several sheets of cores formed of a silicon steel plate, each pressed as a single sheet, and then performing the pressing process. Therefore, only the individual sheets of cores having different shapes are stacked on upper and lower portions, whereby the burr insertion stepped part 156 may be formed in the stator core 150.

As a result, the burr insertion stepped part 156 is included in the stator core 150 to prevent the lifespan of the pressing mold for molding the sleeve holder 140 from being shortened, whereby the manufacturing costs of the spindle motor 100 may be reduced.

Meanwhile, as described above, the spindle motor 100 according to the embodiment of the present invention includes the adhesive receiving stepped part 158 formed in the upper surface of the stator core 150, such that the pulling magnet 160 may be more firmly mounted on the stator core 150.

Hereinafter, a spindle motor according to another embodiment of the present invention will be described with reference to the accompanying drawings. However, a detailed description of components the same as those mentioned above will be omitted.

Figure 4:
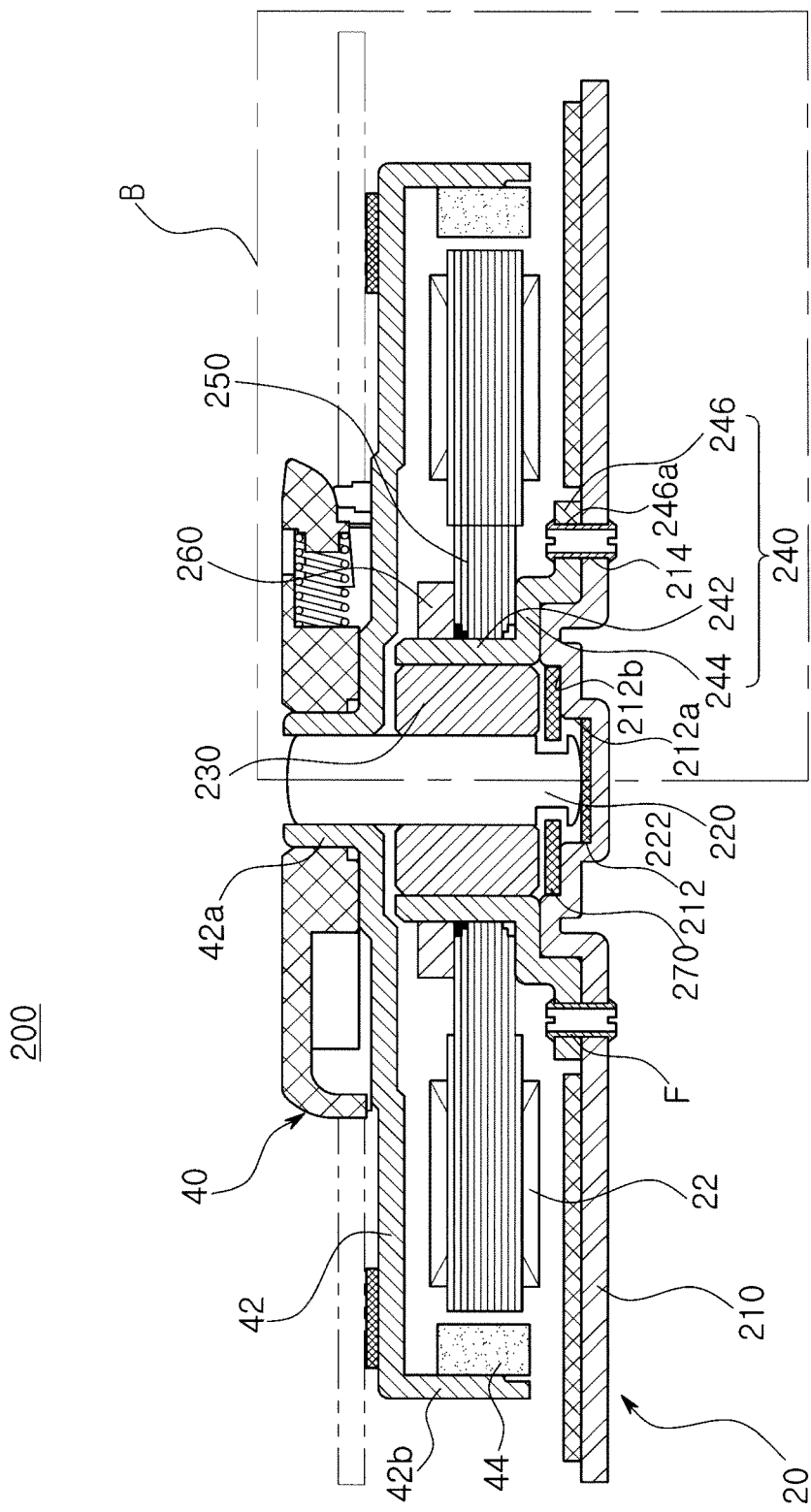
FIG. 4 is a cross-sectional view schematically showing a spindle motor according to another embodiment of the present invention.
Figure 5:
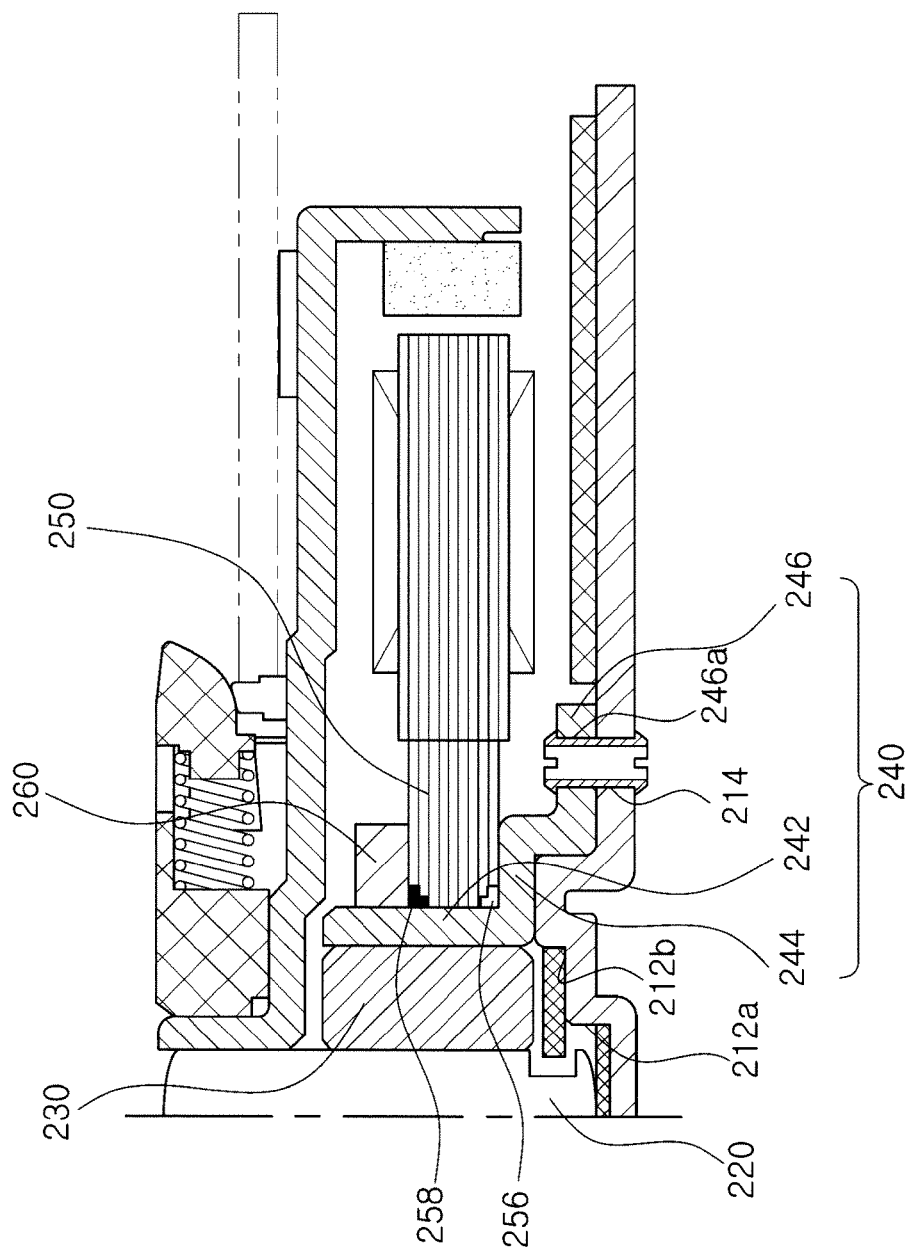
FIG. 5 is an enlarged view of part B of FIG. 4.

FIG. 4 is a cross-sectional view schematically showing a spindle motor according to another embodiment of the present invention; FIG. 5 is an enlarged view of part B of FIG. 4; and FIG. 6 is a bottom perspective view showing a stator core according to another embodiment of the present invention.

Figure 6:
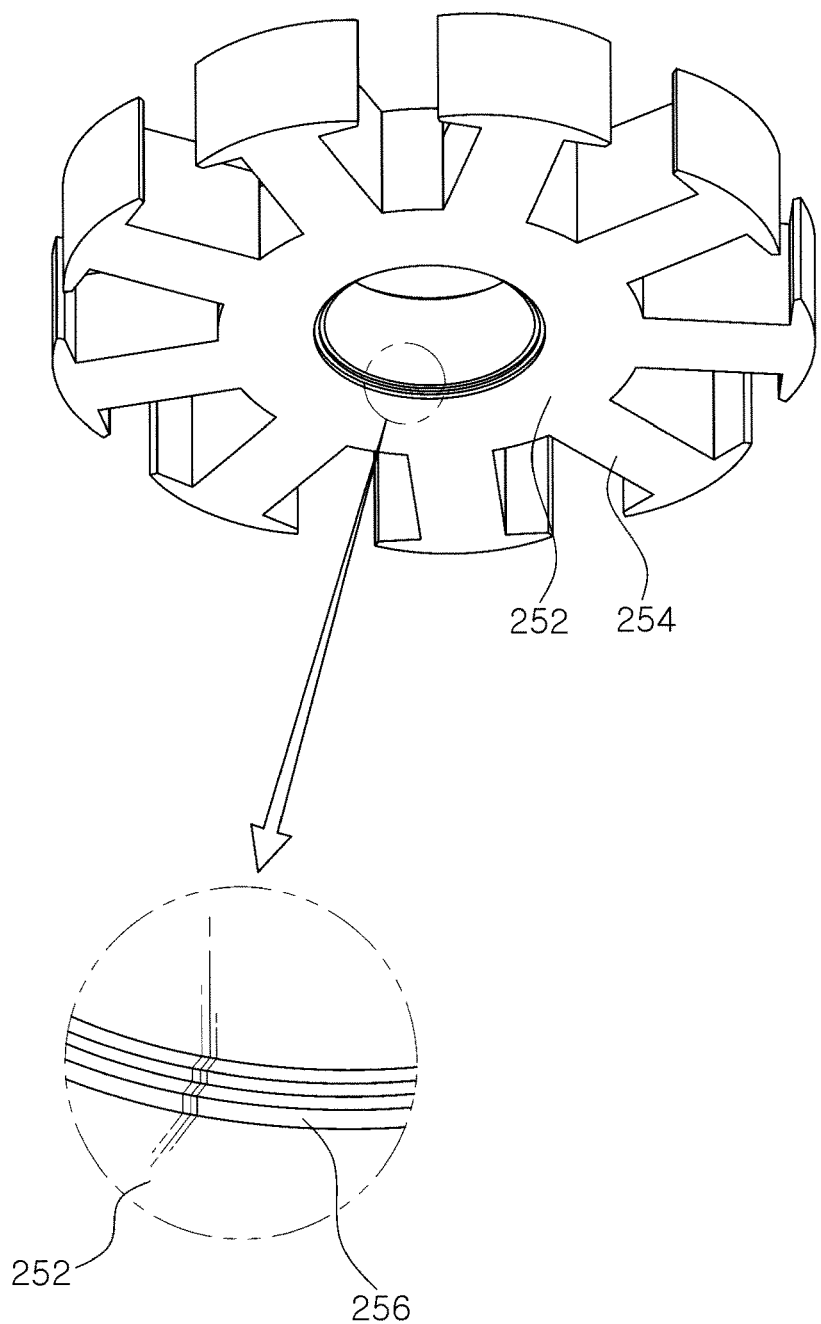
FIG. 6 is a bottom perspective view showing a stator core according to another embodiment of the present invention.

Referring to FIGS. 4 and 6, a spindle motor 200 according to another embodiment of the present invention may include a base member 210, a shaft 220, a sleeve 230, a sleeve holder 240, a stator core 250, and a pulling magnet 260.

Meanwhile, the base member 210, the shaft 220, the sleeve 230, the sleeve holder 240, and the pulling magnet 260 of the spindle motor 200 according to another embodiment of the present invention are the same as the base member 110, the shaft 120, the sleeve 130, the sleeve holder 140, and the pulling magnet 160 of the spindle motor 100 according to the above-mentioned embodiment of the present invention. Therefore, a detailed description thereof will be omitted.

The stator core 250 may include a burr insertion stepped part 256 and an adhesive receiving stepped part 258, similar to the stator core 150 in the above-mentioned embodiment.

Meanwhile, the burr insertion stepped part 256 and the adhesive receiving stepped part 258 may be formed to have a plurality of steps.

Therefore, the adhesive receiving stepped part 258 may receive more adhesive, whereby the adhesion strength of the pulling magnet 260 may be improved.

In addition, the burr insertion stepped part 256 may be formed to have the plurality of steps to thereby be capable of more certainly preventing the burrs generated by the pressing process from protruding downwardly of a body part 252. Therefore, interference between the stator core 250 and the sleeve holder 240 due to the burrs may be more certainly prevented.

Meanwhile, the spindle motor 200 according to this embodiment of the present invention may implement all effects implemented by the spindle motor 100 according to the above-mentioned embodiment of the present invention.

As set forth above, according to embodiments of the present invention, a space in which the burrs generated at the time of the pressing process may be insertedly disposed is provided through the burr insertion stepped part formed in the lower edge of the inner diameter portion of the stator core, whereby interference due to the burrs generated at the time of the assembly of the sleeve holder and the stator core may be reduced and assembly tolerance may be reduced.

In addition, a structure capable of reducing interference with the burrs may not be used in the sleeve holder having a more complicated shape than that of the stator core, such that a lifespan of the pressing mold used at the time of the molding of the sleeve holder may be increased, wherein the manufacturing costs of the spindle motor may be reduced.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
a sleeve rotatably supporting a shaft;
a sleeve holder supporting the sleeve and formed through a pressing process;
a stator core fixedly mounted on an outer circumferential surface of the sleeve holder; and
a pulling magnet fixedly mounted on an upper surface of the stator core,
wherein the stator core includes a burr insertion stepped part formed in a lower portion of an inner diameter portion thereof,
wherein the sleeve holder includes
a cylindrical part supporting the sleeve;
a seating part extending outwardly from a lower end of the cylindrical part in a radial direction and having the stator core seated thereon; and
a coupling part extending from the seating part, formed to be bent therefrom, and attached to the base member,
wherein the cylindrical part, the seating part and the coupling have the same thickness and
wherein the burr insertion stepped part forms a closed space with the sleeve holder when the stator core is mounted on the sleeve housing.

2. The spindle motor of claim 1, wherein the stator core includes an adhesive receiving stepped part formed in an upper portion of the inner diameter portion thereof, the adhesive receiving stepped part receiving an adhesive applied at the time of adhering the pulling magnet.

3. The spindle motor of claim 1, wherein the coupling part includes a connecting hole formed therein, the connecting hole having a fixing member inserted therein so as to attach the coupling part to the base member.

4. The spindle motor of claim 1, wherein the burr insertion stepped part is disposed in a corner formed by the cylindrical part and the seating part.

5. The spindle motor of claim 2, wherein the burr insertion stepped part and the adhesive receiving stepped part are formed to have a plurality of steps.

6. A spindle motor comprising:
a base member including a mounting part formed to be stepped;
a shaft disposed on the mounting part;
a sleeve rotatably supporting the shaft and disposed on the mounting part;
a sleeve holder attached to the base member so as to support the sleeve and formed through a pressing process;
a stator core fixedly mounted on an outer circumferential surface of the sleeve holder and including a burr insertion stepped part formed in a lower edge of an inner diameter portion thereof, the burr insertion stepped part having burrs inserted thereinto, the burrs being generated by the pressing process; and
a pulling magnet fixedly mounted on an upper surface of the stator core,
wherein the sleeve holder includes
a cylindrical part supporting the sleeve;
a seating part extending outwardly from a lower end of the cylindrical part in a radial direction and having the stator core seated thereon; and
a coupling part extending from the seating part, formed to be bent therefrom, and attached to the base member,
wherein the cylindrical part, the seating part and the coupling part have the same thickness and
wherein the burr insertion stepped part forms a closed space with the sleeve holder when the stator core is mounted on the sleeve housing.

7. The spindle motor of claim 6, wherein the stator core includes an adhesive receiving stepped part in an upper edge of the inner diameter portion thereof, the adhesive receiving stepped part receiving an adhesive applied at the time of adhering the pulling magnet.

8. The spindle motor of claim 7, wherein the burr insertion stepped part and the adhesive receiving stepped part are formed to have a plurality of steps.

* * * * *